United States Patent
Xu et al.

(10) Patent No.: US 7,596,283 B2
(45) Date of Patent: Sep. 29, 2009

(54) FAST PARAMETRIC NON-RIGID IMAGE REGISTRATION BASED ON FEATURE CORRESPONDENCES

(75) Inventors: Chenyang Xu, Allentown, NJ (US);
Xiaolei Sharon Huang, Piscataway, NJ (US); Yiyong Sun, Lawrenceville, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 789 days.

(21) Appl. No.: 11/099,143

(22) Filed: Apr. 5, 2005

(65) Prior Publication Data

US 2005/0249434 A1 Nov. 10, 2005

Related U.S. Application Data

(60) Provisional application No. 60/561,864, filed on Apr. 12, 2004.

(51) Int. Cl.
  *G06K 9/32* (2006.01)
  *G06K 9/68* (2006.01)
  *G06K 9/00* (2006.01)
  *A61B 5/05* (2006.01)

(52) U.S. Cl. .................. 382/294; 382/128; 382/220; 600/411

(58) Field of Classification Search ............ 382/128, 382/130, 131, 294, 220; 600/411
See application file for complete search history.

(56) References Cited

U.S. PATENT DOCUMENTS 5,633,951 A * 5/1997 Moshfeghi ............... 382/154

(Continued)

OTHER PUBLICATIONS

Liang et al, "Automated Registration of Multimodality Images by Maximization of a Region Similarity Measure", Image Processing, 1997. Proceedings., International Conference on Publication Date: Oct. 26-29, 1997 vol. 3, On pp. 272-275 vol. 3. □□.*

(Continued)

*Primary Examiner*—Andrew W. Johns
*Assistant Examiner*—Andrae S Allison

(57) ABSTRACT

A method and system for non-rigidly registering a fixed to a moving image utilizing a B-Spline based free form deformation (FFD) model is disclosed. The methodology utilizes sparse feature correspondences to estimate an elastic deformation field in a closed form. In a multi-resolution manner, the method is able to recover small to large non-rigid deformations. The resulting deformation field is globally smooth and guarantees one-to-one mapping between the images being registered. The method generally comprises the steps of: detecting feature points on the fixed image and feature points on the moving image; assigning a feature vector to each feature point; calculating the dissimilarity of each pair of feature vectors for feature pairs on the fixed image and the moving image; calculating the correspondence between feature pairs based on the dissimilarity measure; solving for a dense deformation field P using a closed form FFD model; and transforming the moving image and the feature points on the moving image using a current FFD deformation field estimate.

9 Claims, 5 Drawing Sheets

U.S. PATENT DOCUMENTS

| | | | |
|---|---|---|---|
| 6,101,238 A * | 8/2000 | Murthy et al. | 378/62 |
| 6,125,164 A * | 9/2000 | Murphy et al. | 378/65 |
| 6,728,424 B1 * | 4/2004 | Zhu et al. | 382/294 |
| 7,106,891 B2 * | 9/2006 | Wyman et al. | 382/128 |
| 7,117,026 B2 * | 10/2006 | Shao et al. | 600/411 |
| 7,177,486 B2 * | 2/2007 | Stewart et al. | 382/294 |
| 7,204,640 B2 * | 4/2007 | Fu et al. | 378/205 |
| 2005/0031176 A1 * | 2/2005 | Hertel et al. | 382/128 |
| 2005/0147325 A1 * | 7/2005 | Chen et al. | 382/294 |

OTHER PUBLICATIONS

Mattes et al, "PET-CT Image Registration in the Chest Using Free-form Deformations", IEEE Transactions on Medical Imaging, vol. 22, No. 1, Jan. 2003.*

Chui et al, "A New Algorithm for Non-Rigid Point Matching", <http://www.dam.brown.edu/people/mariom/AM282-01/PAPERS/LANDMARK/chui_rangarajan.pdf>□□.*

* cited by examiner

FAST PARAMETRIC NON-RIGID IMAGE REGISTRATION BASED ON FEATURE CORRESPONDENCES

This non-provisional application claims the benefit of Provisional Appl. Ser. No. 60/561,864, entitled "FAST PARAMETRIC NON-RIGID IMAGE REGISTRATION BASED ON FEATURE CORRESPONDENCES," filed on Apr. 12, 2004.

BACKGROUND OF THE INVENTION

The present invention relates generally to medical imaging, and more particularly, to an efficient deformable registration methodology using a B-spline based free-form deformation model. The method utilizes sparse feature correspondences to estimate an elastic deformation field in a closed form. In a multi-resolution manner, the method is able to permit the recovery of small to large non-rigid deformations, such that the resulting deformation is globally smooth and guaranteeing one-to-one mapping between two images being registered.

Non-rigid (i.e., deformable) registration is an active and important topic of research in medical imaging. This process has numerous clinical applications, such as, for example, the study of PET-CT chest images and MR kidney perfusion time series, where respiratory motion causes gross changes in shape of the organs. It is employed in computational anatomy to adapt an anatomical template to individual anatomies. It is also used in brain imaging for spatial normalization of functional images, group analysis, and the like. Despite vast research efforts, however, non-rigid registration remains a primarily academic interest, and is not currently used in industry.

The reasons for the lack of industrial use are varied. State-of-the-art non-rigid registration methods are relatively slow, with running times on a typical workstation on the order of minutes to hours. Furthermore, most non-rigid registration methods do not directly solve the problem of anatomical correspondences. In many registration algorithms, maximum image similarities are pursued, and correspondences are only generated somewhat as a byproduct at the end of the registration. This poses problems when it comes to validation, since correct anatomical correspondences are the ultimate goal of a good registration method, as opposed to the ability and accuracy to transform one image into a clone of the other image. Finally, there is still no widely accepted validation protocol for measuring the quality of a deformation field generated by a registration method. For most available algorithms, no formal justification for the uniqueness of the solution is provided.

Existing methods for non-rigid registration fall into three general categories: feature-based registration, intensity-based registration, and hybrid methods that integrate the former. Feature based models utilize anatomical knowledge in determining sparse feature correspondences. These can be the faster of the implementations. The well-known disadvantage with this procedure is the need for user interaction to select good features for determining feature correspondences. Compared to rigid-registration, more features are necessary in non-rigid registration in order to recover a dense local deformation field, thus demanding a more automatic and principled method for extracting features, finding correspondences, and estimating elastic deformation. Intensity based methods are much more widely used in non-rigid registration. See, e.g., D. Rueckert, L. I. Sonda, C. Hayes, D. L. G. Hill, M. O. Leach, and D. J. Hawks, "Nonrigid Registration Using Free-Form Deformations: Application to Breast MR Images," IEEE Transactions on Medical Imaging, Vol. 18, No. 8, pp. 712-721, August 1999. They can be fully automated without prior feature extraction. Typically a dense local deformation field is recovered by optimizing certain energy functions. A regularization term is usually included to explicitly force the smoothness of the deformation field. However, the intensity-based methods do not directly solve the anatomical correspondence problem. Another major concern with this method is that it tends to be very slow. By not discriminating good image elements (e.g., salient anatomical boundary features) from poor ones (e.g., noise, pixels/voxels in homogeneous regions that induce correspondence ambiguity), the cost functions to be optimized are often complex and non-convex, thereby making optimization prone to be stuck in local minima. Hybrid methods aim to integrate the merits of the feature-based and intensity-based models. See, e.g., D. Shen and C. Davatzikos, "Hammer: Hierarchical Attribute Matching Mechanism for Elastic Registration," IEEE Transactions on Medical Imaging, Vol. 21, No. 11, pp. 1421-1439, November 2002; J. Kybic and M. Unser, "Fast Parametric Elastic Image Registration, IEEE Transactions on Image Processing [need cite]. These have been the subject of greater interest in recent times.

One important aspect of non-rigid registration is the choice of the local transformation (deformation) model. In the prior art, both parametric and non-parametric models have been considered. In parametric local deformation models, the thin-plate spline model and free form deformation model are most popular. In non-parametric models, elastic deformation and viscous fluid models are commonly employed.

SUMMARY OF INVENTION

In view of the foregoing, it is an object of the invention to provide a system and methodology that utilizes an efficient non-rigid registration algorithm that can register large volumes of data and time series in real time or near to real time.

It is another object of the invention to provide a system and methodology that utilizes a non-rigid registration algorithm that provides for a recovered deformation field that guarantees good anatomical correspondences.

It is yet another object of the invention to provide a system and methodology that utilizes a non-rigid registration algorithm that is easily adaptable to multi-modalities and images of different anatomical structures.

It is still another object of the invention to provide a system and methodology that utilizes a non-rigid registration algorithm that is robust to image noise, intensity change and inhomogeneity, partial occlusion and missing parts.

It is yet another object of the invention to provide a system and methodology that utilizes a non-rigid registration algorithm that assures consistent results regardless of which image is treated as the fixed image and which image is treated as the moving image.

It is still another object of the invention to provide a system and methodology that utilizes a non-rigid registration algorithm that provides for a recovered deformation field that should ideally conform to the actual biomechanical deformations within the tissue of interest.

It is yet another object of the invention to provide a system and methodology that utilizes a non-rigid registration algorithm that provides for a recovered deformation field that can detect where structure appears or disappears between the fixed and moving images.

In accordance with an aspect of the present invention, there is provided a system and methodology for non-rigidly registering a fixed to a moving image utilizing a B-Spline based free form deformation (FFD) model. The methodology utilizes sparse feature correspondences to estimate an elastic deformation field in a closed form. In a multi-resolution manner, the method is able to recover small to large non-rigid deformations. The resulting deformation field is globally smooth and guarantees one-to-one mapping between the images being registered. The method generally comprises the steps of: detecting feature points on the fixed image and feature points on the moving image; assigning a feature vector to each feature point; calculating the dissimilarity of each pair of feature vectors for feature pairs on the fixed image and the moving image; calculating the correspondence between feature pairs based on dissimilarity measure: $X_i$ and $X_i'$; solving for a dense deformation field P using a closed form FFD model; and transforming the moving image and the feature points on the moving image using a current FFD deformation field estimate. In accordance with another aspect of the present invention, there is provided a memory medium containing program instructions which, when executed by a processor, enable a computer to implement the foregoing method.

These and other advantages of the invention will be apparent to those of ordinary skill in the art by reference to the following detailed description and the accompanying drawings.

DETAILED DESCRIPTION OF THE PREFERRED EMBODIMENTS

Figure 1:
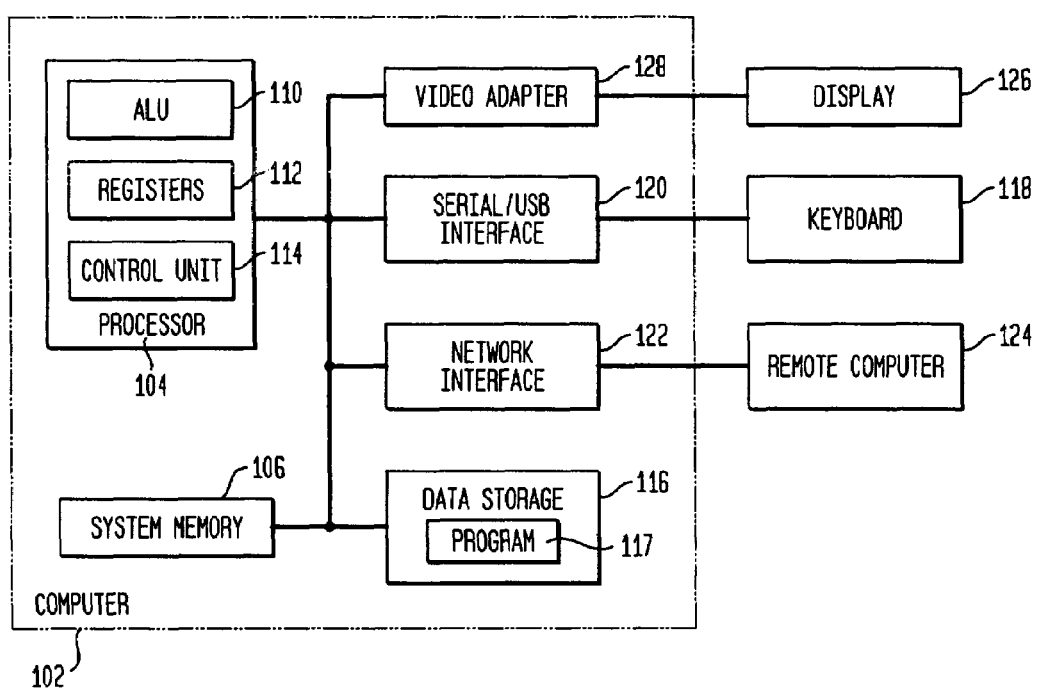
FIG. 1 is a schematic of a computer system for carrying out a preferred embodiment of the invention.

FIG. 1 depicts an operating environment for an illustrated embodiment of the present invention, comprising a computer system 100 for implementing non-rigid image registration. The system 100 includes a conventional computer 102, comprising a processing unit 104, a system memory 106, and a system bus 108 that couples the various system components including the system memory to the processing unit 104. The processing unit is of conventional design and includes a typical arithmetic logic unit (ALU) 110 for performing computations, a collection of registers 112 for temporary storage of data and instructions, and a control unit 114 as is well known in the art. The system bus 108 may be any of several types of bus structures including a memory bus or memory controller, peripheral bus, and a local bus using any of a variety of bus architectures. The system memory 106 includes read only memory (ROM) and random access memory (RAM). The system memory 106 further includes a basic input/output system (BIOS) which contains the basic routine that helps to transfer information between elements in computer 102. The computer 102 further includes data storage 116 which may comprise a hard disk drive, magnetic disk drive, optical disk drive or the like and the appropriate interfaces to the system bus 108. The drives and their associated computer-readable media provide non-volatile storage of computer readable instructions, data structures, program modules and other data for the computer 102. A number of program modules may be stored on the hard disk, magnetic disk, optical disk, ROM or RAM, including an operating system, one or more application programs, other program modules, and program data. The application programs may include a computer program 117 adapted for carrying out the methodology of the invention as discussed in greater detail hereinbelow. A user of the system can enter commands via a keyboard 118 coupled to the system bus 108 through a serial or USB interface 120. The computer may be provided with a network interface 122 to enable networked communication with a remote computer(s) 124. The remote computer can be a personal computer, server, router, network PC, peer device or other common network node. A display 126 is coupled to the system bus 108 through a video adapter 128 in a conventional manner.

Figure 2A:
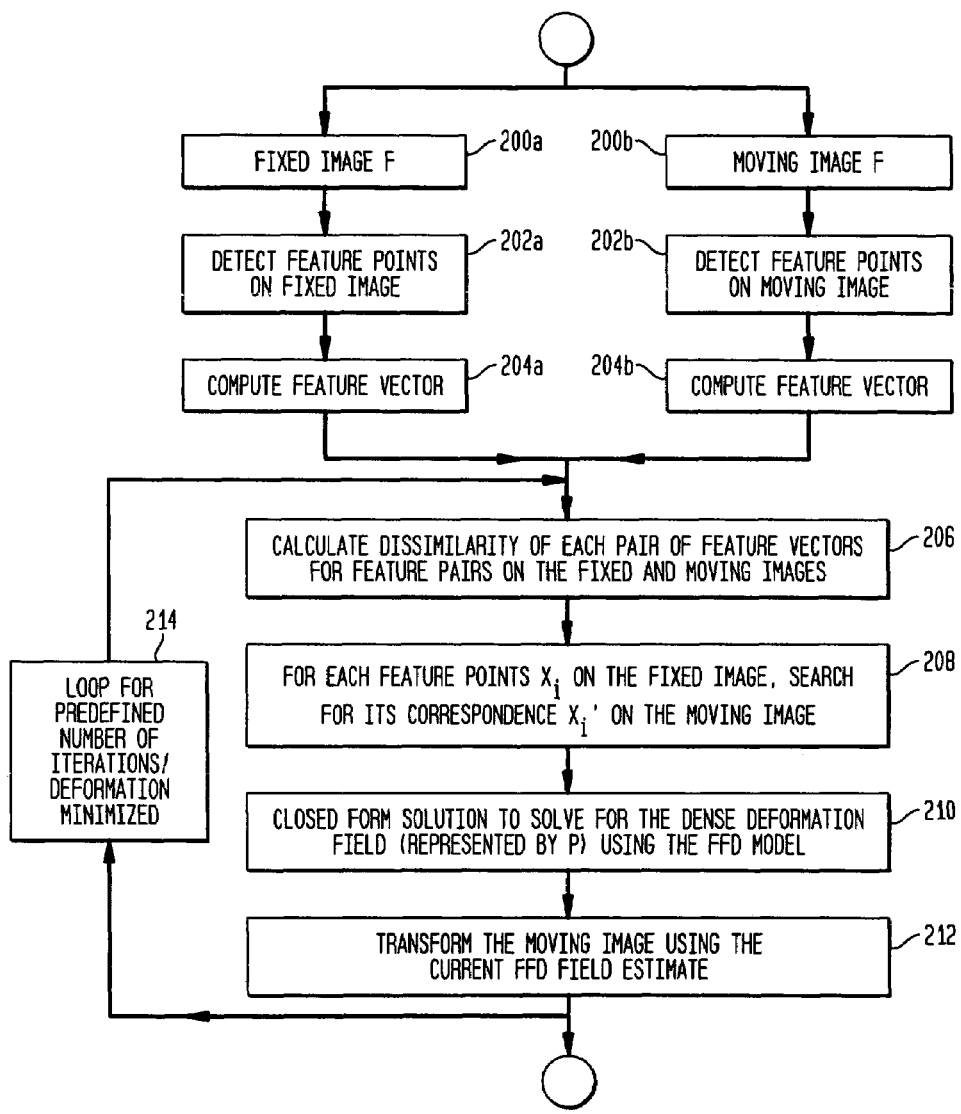
FIG. 2*a* is a flowchart of a method in accordance with the invention.
Figure 2B:
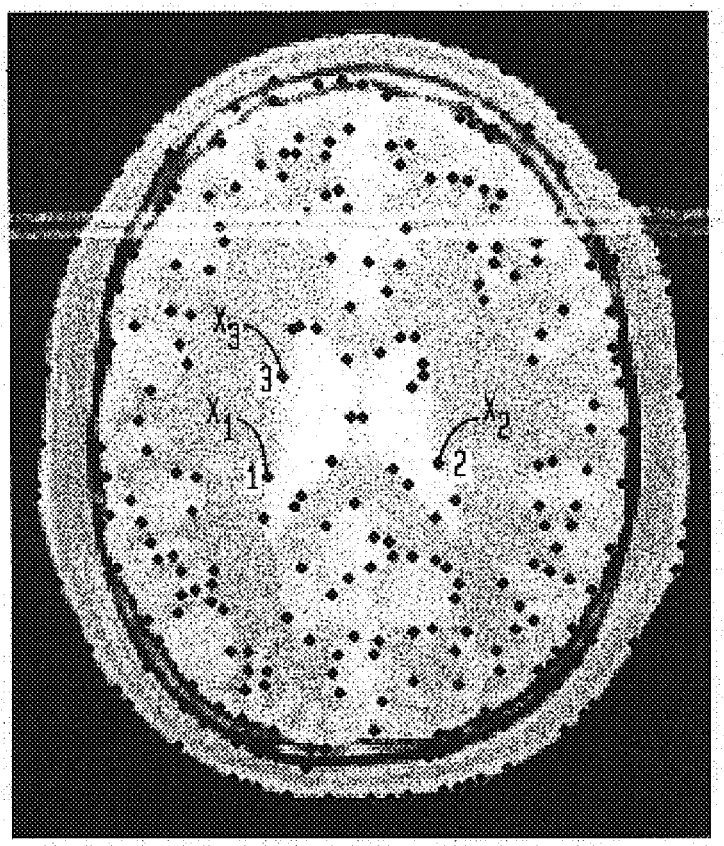
FIG. 2*b* is an exemplary fixed image and a set of feature points thereon.
Figure 2C:
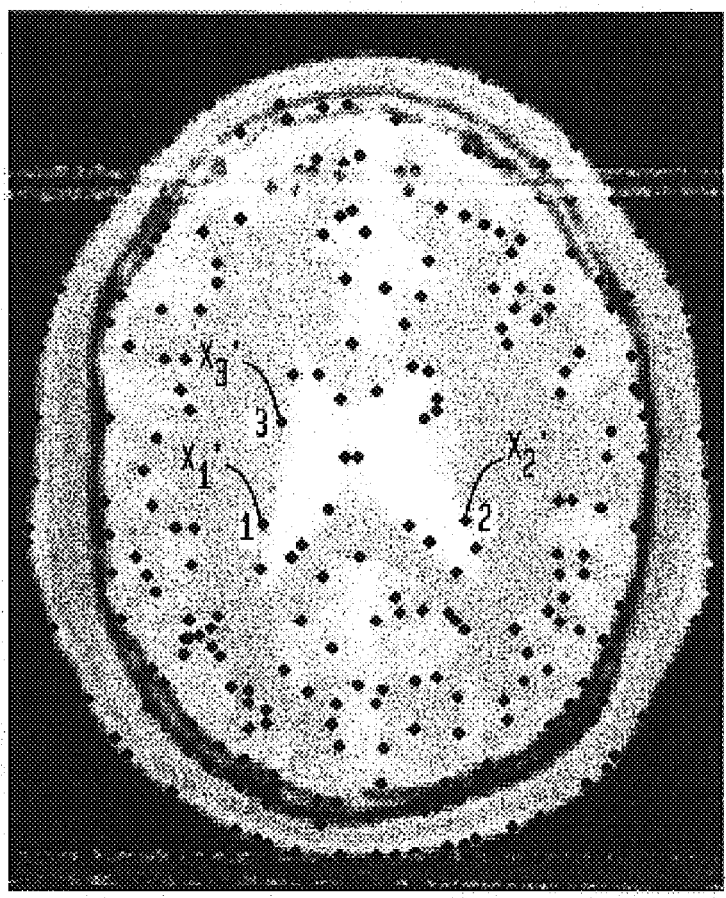
FIG. 2*c* is an exemplary moving image corresponding to the fixed image depicted in FIG. 2*b* and the set of detected feature points on the moving image which correspond to a set of feature points on the moving image.

Referring now to FIG. 2*a*, there is depicted a flowchart of a method of using a non-rigid registration algorithm in accordance with an aspect of the present invention to register a fixed image (FIG. 2*b*) on the computer display (126 depicted in FIG. 1 with a moving image on the computer display depicted in FIG. 2*c*. In accordance with this method, it is assumed that a proper rigid registration algorithm has been applied to bring the two images into rough spatial alignment. An exemplary rigid registration algorithm is disclosed in the following publication: C. Xu, X. Huang, Y. Sun, C. Chefdhotel, J. Guehring, F. Sauer, V. Sebastion, "A Hybrid Rigid Registration Model for 2D/3D Medical Images," Invention Disclosure, Siemens Corporate Research, Inc., August 2003. The inventive method consists of . . . is sufficient.

In order to utilize similarity measures for finding local correspondences, suppose a local window centered at a feature point is W, the fixed image is f, and the moving image is m. The first multi-modal similarity measure is the Squared Normalized Cross Correlation:

$$R = \left( \frac{\sum_{(i,j)\in w} (f(i,j) - (\overline{f}))(m(i,j) - (\overline{m}))}{\sqrt{\sum_{(i,j)\in w} (f(i,j) - (\overline{f}))^2} \sqrt{\sum_{(i,j)\in w} (m(i,j) - (\overline{m}))^2}} \right)^2$$

where $\overline{f}$ denotes the mean intensity value in the local window on the fixed image, and $\overline{m}$ is the mean intensity value in a local window on the moving image. Another similarity measure is the Local Mutual Information, where we denote the intensity probability distribution in the small window in the fixed image or volume as $p_f$, and that in the testing window in the moving image or volume as $p_m$. With the joint density as $p_{f,m}$, the local mutual information is defined as $$MI = H(f) + H(m) - H(f,m) = \int\int P_{f,m}(i_1, i_2) \log \frac{P_{f,m}(i_1, i_2)}{P_f(i_1) P_m(i_2)} di_1 di_2$$

As described briefly above, given a set of corresponding points between the fixed image and the moving image, we model the deformation using a Cubic B-spline FFD model, which is a space deformation model that deforms an object by manipulating a regular control lattice P overlaid on the volumetric embedding space. In the registration problem, the inverse inference problem is considered, in which the deformations between images are solved with respect to the control lattice coordinates that are parameters of FFD. The following describes the closed-form FFD based registration method in detail.

Considering a regular lattice of control points:

$$P_{m,n} = (P_{m,n}^x, P_{m,n}^y); m=1,\ldots,M, n=1,\ldots,N$$

overlaid to an image region $$\Gamma = \{x\} = \{(x,y) | 1 \leq x \leq X, 1 \leq y \leq Y\}$$

Denote the initial configuration of the control lattice as $P^0$, and the deforming control lattice as $P = P^0 + \delta P$. Under these assumptions, we consider the FFD parameters are the deformations of the control points in both directions (x,y);

$$\Theta = \{(\delta P_{m,n}^x, \delta P_{m,n}^y)\}; (m,n) \in [1,M] \times [1,N]$$

Given the deformation of the control lattice from $P^0$ to P, the deformed location $L(x)=(x',y')$ of a pixel $x=(x,y)$, is defined in terms of a tensor product of a Cubic B-spline:

$$L(x) = x + \delta L(x) = \sum_{k=0}^{3} \sum_{l=0}^{3} B_k(u) B_l(v) (P_{i+k,j+l}^0 + \delta P_{i+k,j+l})$$

where, by definition:

$$x = \sum_{k=0}^{3} \sum_{l=0}^{3} B_k(u) B_l(v) P_{i+k,j+l}^0$$

are the initial coordinates of the pixel x.

$$\delta L(x) = \sum_{k=0}^{3} \sum_{l=0}^{3} B_k(u) B_l(v) \delta P_{i+k,j+l}$$

is the incremental deformation at pixel x, $\delta P_{i+k,j+l}$, $(k,l) \in [0,3] \times [0,3]$, in which $$i = \left\lfloor \frac{x}{X} \cdot (M-1) \right\rfloor + 1$$

and $$j = \left\lfloor \frac{y}{Y} \cdot (N-1) \right\rfloor + 1,$$

consists of the deformations of pixel x's (sixteen) adjacent control points, $B_k(u)$ is the $k^{th}$ basis function of the Cubic B-spline given by;

$$B_0(u) = (1-u)^3/6, \; B_1(u) = (3u^3 - 6u^2 + 4)/6$$

$$B_2(u) = (-3u^3 + 3u^2 + 3u + 1)/6, \; B_3(u) = u^3/6$$

with $$u = \frac{x}{X} \cdot M - \left\lfloor \frac{x}{X} \cdot M\pi \right\rfloor \cdot B_l(v)$$

is similarly defined.

From the equation above, we have:

$$L(x) - x = \sum_{k=0}^{3} \sum_{l=0}^{3} B_k(u) B_l(v) \delta P_{i+k,j+l}$$

In accordance with the inventive method for efficient non-rigid image registration, we pick n feature sample points $x_i = (x_i, y_i)$, $i=1,\ldots,n$, from the target (fixed) image (FIG. 2b), and find their correspondences $x_i' = (x_i', y_i')$, on the source (moving) image (FIG. 2c). In a typical 256*256 image, n can range from several hundred to several thousand, and can be chosen depending on the estimated intrinsic resolution of the image deformation to be recovered Assuming $x_i'$ is the deformed location $L(x)$, then the relationship between the two point sets can be depicted in a matrix equation format as follows:

$$U = Sp$$

where, U is the displacement matrix between the correspondence pairs:

$$U = \begin{pmatrix} x_1' - x_1 & y_1' - y_1 \\ x_2' - x_2 & y_2' - y_2 \\ \vdots & \vdots \\ x_n' - x_n & y_n' - y_n \end{pmatrix}_{n \times 2},$$

S is the Cubic B-spline basis matrix:

$$S = \begin{pmatrix} \cdots & \cdots & [b_{i_1+0,j_1+l}] & \cdots & [b_{i_1+1,j_1+l}] & \cdots & [b_{i_1+2,j_1+l}] & \cdots & [b_{i_1+3,j_1+l}] & \cdots \\ & \ddots & & \ddots & & \ddots & & \ddots & & \ddots \\ \cdots & [b_{i_c+0,j_c+l}] & \cdots & [b_{i_c+1,j_c+l}] & \cdots & [b_{i_c+2,j_c+l}] & & [b_{i_c+3,j_c+l}] & \cdots & \cdots \\ & \ddots & & \ddots & & \ddots & & \ddots & & \ddots \\ \cdots & \cdots & [b_{i_n+0,j_n+l}] & \cdots & [b_{i_n+1,j_n+l}] & \cdots & [b_{i_n+2,j_n+l}] & \cdots & [b_{i_n+3,j_n+l}] & \cdots \end{pmatrix},$$

And p is comprised of the FFD parameters in a matrix:

$$p = \begin{pmatrix} \delta P^x_{1,1} & \delta P^y_{1,1} \\ \delta P^x_{1,2} & \delta P^y_{1,2} \\ \vdots & \vdots \\ [\delta P^x_{i_c+0,j_c+l}] & [\delta P^y_{i_c+0,j_c+l}] \\ \vdots & \vdots \\ [\delta P^x_{i_c+1,j_c+l}] & [\delta P^y_{i_c+1,j_c+l}] \\ \vdots & \vdots \\ [\delta P^x_{i_c+2,j_c+l}] & [\delta P^y_{i_c+2,j_c+l}] \\ \vdots & \vdots \\ [\delta P^x_{i_c+3,j_c+l}] & [\delta P^y_{i_c+3,j_c+l}] \\ \vdots & \vdots \\ \delta P^x_{M,N} & \delta P^y_{M,N} \end{pmatrix}_{(M \times N) \times 2}$$

In the B-Spline basis matrix S, $c=1, \ldots, n$ is the index of a corresponding pair, and $[b_{i_c+k,j_c+l}]$ is the abbreviation for:

$$[b_{i_c+k,j_c+l}] = (B_k(u_c)B_0(v_c) \; B_k(u_c)B_2(v_c) \; B_k(u_c)B_k(v_c) \; B_k(u_c)B_3(v_c)).$$

In the FFD parameter p matrix, $[\delta P_{i_c+k,j_c+l}]$ is the abbreviation for:

$$[\delta P_{i_c+k,j_c+l}] = \begin{pmatrix} \delta P_{i_c+k,j_c+0} \\ \delta P_{i_c+k,j_c+1} \\ \delta P_{i_c+k,j_c+2} \\ \delta P_{i_c+k,j_c+3} \end{pmatrix},$$

and the column indices of a $[b_{i_c+k,j_c+l}]$ in S are the same as the row indices as a $[\delta P_{i_c+k,j_c+l}]$ in matrix p. Thus, based on this parametric free form transformation model, a closed form solution for the control lattice deformation can be solved utilizing Singular value Decomposition efficiently as:

$$\hat{p} = S^+ U$$

In real applications, since the process of finding the correspondences introduces errors, the solution to the foregoing is the Ordinary Least Squares (OLS) solution to the problem:

$$\underset{p}{\text{minimize}} \sum_{i=1}^{n} \|x'_i - L(p;x)\|.$$

Figure 3:
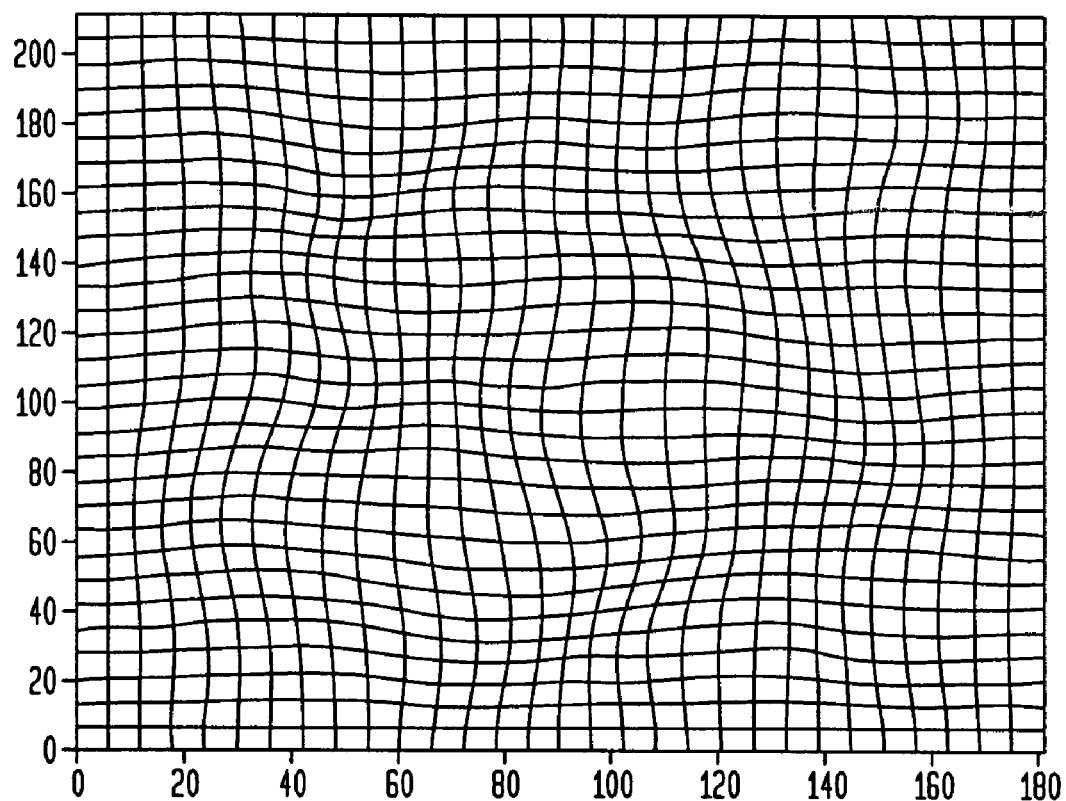
FIG. 3 is a comparison of the recovered space deformation and ground truth deformation.

This approach efficiently recovers relatively large to local non-rigid deformations utilizing sparse feature correspondences in closed form. The resulting deformation field has been demonstrated to be globally smooth, and minimizes the distance between the target feature points and transformed source feature points. FIG. 3 is a comparison of the recovered space deformation and ground truth deformation for the exemplary images depicted in FIGS. 2b and 2c. In this example, the moving image is a phantom image generated by artificially deforming the regular control lattice. Accordingly, the ground-truth deformed control lattice that originally generated the moving image is known. By comparing the deformation field recovered by the registration method disclosed herein with the ground truth deformation, the accuracy of the registration method is known.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

We claim:

1. In a computer, a method of non-rigid image registration between a fixed image and a moving image, comprising the steps of:
   (a) detecting feature points on the fixed image and feature points on the moving image;
   (b) assigning a feature vector to each feature point;
   (c) calculating the dissimilarity of each pair of feature vectors for feature pairs on the fixed image and the moving image;
   (d) calculating the correspondence between feature pairs based on dissimilarity measure: Xi and Xi';
   (e) solving for a dense deformation field P using a closed form free from deformation (FFD) model; and
   (f) transforming the moving image and the feature points on the moving image using a current FFD deformation field estimate.

2. The method recited in claim 1, further comprising repeating steps (b) through (d) to minimize the deformation field estimate.

3. The method recited in claim 1, wherein the selected feature points have the highest local entropy.

4. The method recited in claim 1, wherein given a regular lattice of control points:

$$P_{m,n} = (P_{m,n}^x, P_{m,n}^y); m=1,\ldots,M, n=1,\ldots,N$$

overlaid to an image region $$\Gamma = \{x\} = \{(x,y) | 1 \leq x \leq X, 1 \leq y \leq Y\}$$

the initial configuration of a control lattice is denoted as $P^0$, and the deforming control lattice as $P = P^0 + dP$, where the FFD parameters are the deformations of the control points in both directions (xy);

$$\Theta = \{(\delta P_{m,n}^x, \delta P_{m,n}^y)\}; (m,n) \in [1,M] \times [1,N]$$

and given the deformation of the control lattice from $P^0$ to P, the deformed location $L(x) = (x',y')$ of a pixel $x = (x,y)$, is defined in terms of a tensor product of a Cubic B-spline:

$$L(x) = x + \delta L(x) = \sum_{k=0}^{3} \sum_{l=0}^{3} B_k(u) B_l(v) (P^0_{i+k,j+l} + \delta P_{i+k,j+l}).$$

5. The method recited in claim 4, wherein $x_i'$ is assumed to be the deformed location L(x), and the relationship between the two point sets can be represented as follows:

U=Spwhere, U is the displacement matrix between the correspondence pairs:

$$U = \begin{pmatrix} x'_1 - x_1 & y'_1 - y_1 \\ x'_2 - x_2 & y'_2 - y_2 \\ \vdots & \vdots \\ x'_n - x_n & y'_n - y_n \end{pmatrix}_{n \times 2},$$

S is the Cubic B-spline basis matrix:

$$S = \begin{pmatrix} \cdots & \cdots & [b_{i_1+0,j_1+l}] & \cdots & [b_{i_1+1,j_1+l}] & \cdots & [b_{i_1+2,j_1+l}] & \cdots & [b_{i_1+3,j_1+l}] & \cdots \\ & \ddots & & \ddots & & \ddots & & \ddots & & \ddots \\ \cdots & [b_{i_c+0,j_c+l}] & \cdots & [b_{i_c+1,j_c+l}] & \cdots & [b_{i_c+2,j_c+l}] & & [b_{i_c+3,j_c+l}] & \cdots & \cdots \\ & \ddots & & \ddots & & \ddots & & \ddots & & \ddots \\ \cdots & \cdots & [b_{i_n+0,j_n+l}] & \cdots & [b_{i_n+1,j_n+l}] & \cdots & [b_{i_n+2,j_n+l}] & \cdots & [b_{i_n+3,j_n+l}] & \cdots \end{pmatrix},$$

And p is comprised of the FFD parameters in a matrix:

$$\begin{pmatrix} \delta P^x_{1,1} & \delta P^y_{1,1} \\ \delta P^x_{1,2} & \delta P^y_{1,2} \\ \vdots & \vdots \\ [\delta P^x_{i_c+0,j_c+l}] & [\delta P^y_{i_c+0,j_c+l}] \\ \vdots & \vdots \\ [\delta P^x_{i_c+1,j_c+l}] & [\delta P^y_{i_c+1,j_c+l}] \\ \vdots & \vdots \\ [\delta P^x_{i_c+2,j_c+l}] & [\delta P^y_{i_c+2,j_c+l}] \\ \vdots & \vdots \\ [\delta P^x_{i_c+3,j_c+l}] & [\delta P^y_{i_c+3,j_c+l}] \\ \vdots & \vdots \\ \delta P^x_{M,N} & \delta P^y_{M,N} \end{pmatrix}_{(M \times N) \times 2},$$

in the B-Spline basis matrix S, c=1, ..., n is the index of a corresponding pair, and $[b_{i_c+k,j_c+l}]$ is the abbreviation for:

$$[b_{i_c+k,j_c+l}] = (B_k(u_c)B_0(v_c)\ B_k(u_c)B_1(v_c)\ B_k(u_c)B_3(v_c)\ B_k(u_c)B_3(v_c)),$$

in the FFD parameter p matrix, $[\delta P_{i_c+k,j_c+l}]$ is the abbreviation for:

$$[\delta P_{i_c+k,j_c+l}] = \begin{pmatrix} \delta P_{i_c+k,j_c+0} \\ \delta P_{i_c+k,j_c+1} \\ \delta P_{i_c+k,j_c+2} \\ \delta P_{i_c+k,j_c+3} \end{pmatrix},$$

wherein, a closed form solution for the control lattice deformation can be solved utilizing Singular value Decomposition as:

$$\hat{p} = S^+ U.$$

6. A computer readable memory medium containing program instructions which, when executed by a processor, enable a computer to non-rigidly register a fixed image to a moving image, by;
 (a) detecting feature points on the fixed image and feature points on the moving image;
 (b) assigning a feature vector to each feature point;
 (c) calculating the dissimilarity of each pair of feature vectors for feature pairs on the fixed image and the moving image;
 (d) calculating the correspondence between feature pairs based on dissimilarity measure: Xi and Xi';
 (e) solving for a dense deformation field P using a closed form free form deformation (FFD) model; and
 (f) transforming the moving image and the feature points on the moving image using a current FFD deformation field estimate.

7. The computer readable memory medium recited in claim 6, further comprising program instructions which, when executed by the processor, repeat steps (c) through (f) to minimize the deformation field estimate.

8. The computer readable memory medium recited in claim 6, wherein given a regular lattice of control points:

$P_{m,n} = (P_{m,n}{}^x, P_{m,n}{}^y); m=1, \ldots, M, n=1, \ldots, N$ overlaid to an image region $\Gamma = \{x\} = \{(x,y) | 1 \leq x \leq X, 1 \leq y \leq Y\}$ the initial configuration of a control lattice is denoted at $P^0$, and the deforming control lattice as $P = P^0 + dP$, where the FFD parameters are the deformations of the control points in both directions (x,y);

$\Theta = \{(\delta P_{m,n}{}^x, \delta P_{m,n}{}^y)\}; (m,n) \in [1,M] \times [1,N]$ and given the deformation of the control lattice from $P^0$ to P, the deformed location L(x)=(x',y') of a pixel x=(x,y), is defined in terms of tensor product of a Cubic B-spline:

$$L(x) = x + \delta L(x) = \sum_{k=0}^{3} \sum_{l=0}^{3} B_k(u) B_l(v)(P^0_{i+k,j+l} + \delta P_{i+k,j+l}).$$

9. The computer readable medium recited in claim 8, wherein $x_i'$ is assumed to be the deformed location L(x), and the relationship between the two point sets can be represented as follows:

U=Sp where, U is the displacement matrix between the correspondence pairs:

$$U = \begin{pmatrix} x'_1 - x_1 & y'_1 - y_1 \\ x'_2 - x_2 & y'_2 - y_2 \\ \vdots & \vdots \\ x'_n - x_n & y'_n - y_n \end{pmatrix}_{n \times 2},$$

S is the Cubic B-spline basis matrix:

$$S = \begin{pmatrix} \cdots & \cdots & [b_{i_1+0,j_1+l}] & \cdots & [b_{i_1+1,j_1+l}] & \cdots & [b_{i_1+2,j_1+l}] & \cdots & [b_{i_1+3,j_1+l}] & \cdots \\ & \ddots & & \ddots & & \ddots & & \ddots & & \ddots \\ \cdots & [b_{i_c+0,j_c+l}] & \cdots & [b_{i_c+1,j_c+l}] & \cdots & [b_{i_c+2,j_c+l}] & & [b_{i_c+3,j_c+l}] & \cdots & \cdots \\ & \ddots & & \ddots & & \ddots & & \ddots & & \ddots \\ \cdots & \cdots & [b_{i_n+0,j_n+l}] & \cdots & [b_{i_n+1,j_n+l}] & \cdots & [b_{i_n+2,j_n+l}] & \cdots & [b_{i_n+3,j_n+l}] & \cdots \end{pmatrix},$$

and p is comprised of the FFD parameters in a matrix:

$$\begin{pmatrix} \delta P^x_{1,1} & \delta P^y_{1,1} \\ \delta P^x_{1,2} & \delta P^y_{1,2} \\ \vdots & \vdots \\ [\delta P^x_{i_c+0,j_c+l}] & [\delta P^y_{i_c+0,j_c+l}] \\ \vdots & \vdots \\ [\delta P^x_{i_c+1,j_c+l}] & [\delta P^y_{i_c+1,j_c+l}] \\ \vdots & \vdots \\ [\delta P^x_{i_c+2,j_c+l}] & [\delta P^y_{i_c+2,j_c+l}] \\ \vdots & \vdots \\ [\delta P^x_{i_c+3,j_c+l}] & [\delta P^y_{i_c+3,j_c+l}] \\ \vdots & \vdots \\ \delta P^x_{M,N} & \delta P^y_{M,N} \end{pmatrix}_{(M \times N) \times 2},$$

in the B-Spline basis matrix S, c=1, ..., n is the index of a corresponding pair, and $[b_{i_c+k,j_c+l}]$ is the abbreviation for:

$$[b_{i_c+k,j_c+l}] = (B_k(u_c)B_0(v_c) \quad B_k(u_c)B_1(v_c) \quad B_k(u_c)B_2(v_c) \quad B_k(u_c)B_3(v_c)),$$

in the FFD parameter p matrix, $[\delta P_{i_c+k,j_c+l}]$ is the abbreviation for:

$$[\delta P_{i_c+k,j_c+l}] = \begin{pmatrix} \delta P_{i_c+k,j_c+0} \\ \delta P_{i_c+k,j_c+1} \\ \delta P_{i_c+k,j_c+2} \\ \delta P_{i_c+k,j_c+3} \end{pmatrix},$$

wherein, a closed form solution for the control lattice deformation can be solved utilizing Singular value Decomposition as:

$$\hat{p} = S^+ U.$$

* * * * *